W. A. SCHMIDT.
CONTROL OF ELECTRICAL DISCHARGES FROM ELECTRICAL CONDUCTORS.
APPLICATION FILED JULY 17, 1911.

1,263,941. Patented Apr. 23, 1918.

Witnesses:
Jno. M. Sweeney
A. W. Cooper.

Inventor:
Walter August Schmidt
By Michael J. Stark & Sons,
Attorneys

UNITED STATES PATENT OFFICE.

WALTER AUGUST SCHMIDT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

CONTROL OF ELECTRICAL DISCHARGES FROM ELECTRICAL CONDUCTORS.

1,263,941.     Specification of Letters Patent.     Patented Apr. 23, 1918.

Application filed July 17, 1911. Serial No. 639,016.

*To all whom it may concern:*

Be it known that I, WALTER AUGUST SCHMIDT, a citizen of the United States, residing at Los Angeles, in the county of Los Angeles and State of California, have invented certain new and useful Improvements in the Control of Electrical Discharges from Electrical Conductors; and I hereby declare the following to be a clear, full, and exact description of the same.

My invention relates broadly to electrical discharges from charged bodies such as high potential conductors, and it has for its object the control and reduction of the electrical leakage or leakages from such bodies, which leakages are often designated as line losses or corona losses. The phenomenon accompanying this discharge or leakage of electricity from a conductor into the surrounding atmosphere is termed the corona, and the voltage at which corona begins is termed the critical voltage.

It is conceded by those skilled in the art that the higher the potential at which electric energy is transmitted through conductors, the greater the efficiency. However, a serious difficulty encountered in indefinitely increasing the potential at which this electric energy is transmitted is that there exists a practical limit for each specific conductor under specific conditions, which, if exceeded, will cause a decided increase in the discharge of electricity into the surrounding atmosphere.

The critical voltage determines the extreme potential under which an electrical conductor may be operated efficiently; an increase in the potential will result in an increase in the electrical leakage therefrom, with an accompanying decrease in efficiency.

An important application of my invention may be found in its employment in high potential transmission lines, as said invention relates particularly to methods and means to overcome, or, at least, to diminish the corona losses, so that, by the utilization of my said invention, a higher potential may be maintained without operating the line at a potential above the critical voltage.

Figure 1:
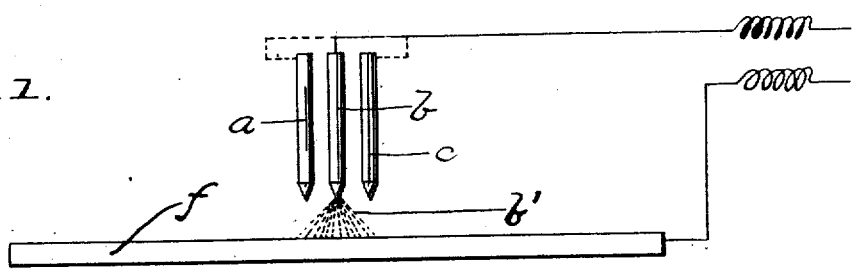
Figure 2:
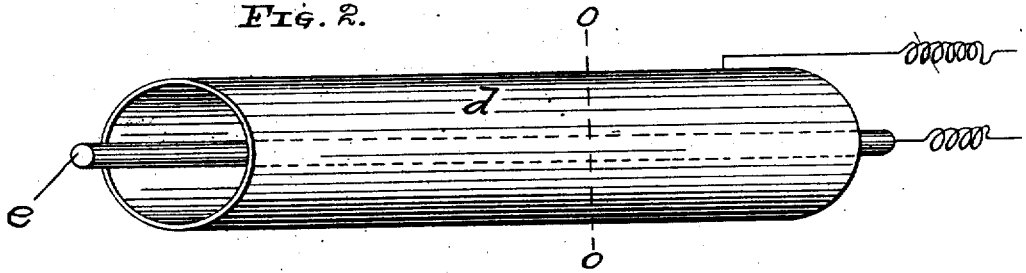
Figure 3:
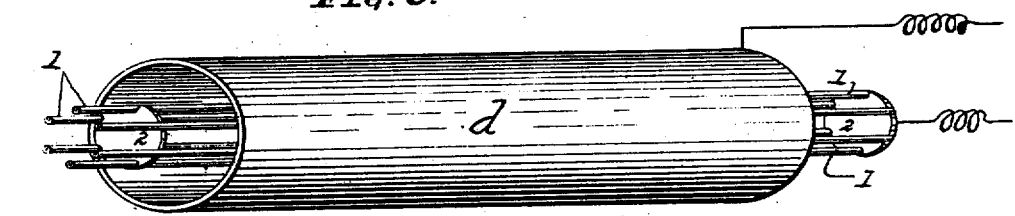
Figure 4:
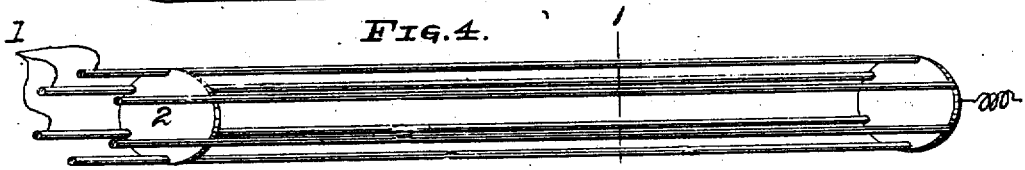
Figure 5:
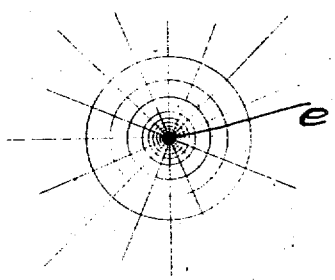
Figure 6:
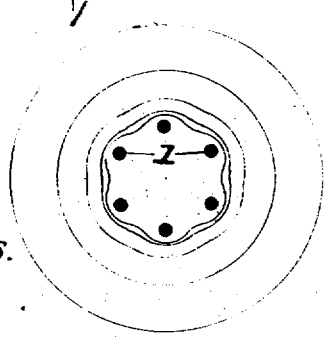

To better understand my invention, reference is now made to the sheet of drawing herewith accompanied and forming a part of this specification, wherein Figure 1 is a diagrammatic elevation of a device initially employed by me to prove the accuracy of my deductions. Figs. 2 and 3 are schematic views of devices used in successive steps taken to demonstrate the fundamentals of my invention. Fig. 4 is a diagrammatic view of a short length of a conductor embodying my invention. Fig. 5 is a section in line O O of Fig. 2, the radial lines being understood to indicate the electric field surrounding the conductor, and, the concentric circles, the uni-potential lines. Fig. 6 is a cross section in lines 1 1 of Fig. 4, showing approximately the distribution of the uni-potential lines in a conductor embodying the subject matter of my invention.

In the course of many experiments I found that if a conductor, such as $b$, Fig. 1, which for example may be a pointed rod, be charged with a potential beyond its critical voltage, a brilliant corona discharge $b'$ would take place therefrom. Next, I established the fact that if similar conductors $a$ and $c$ be arranged in the same plane with conductor $b$, on opposite sides thereof and in close proximity thereto, all having their points in the same plane and being arranged perpendicularly to a relatively large metallic plate $f$; and said conductors be charged to the same electrical potential to which $b$ was originally charged, the corona discharge $b'$ was destroyed. In order to produce this result, it is necessary that the conductor $b$ should be in a certain zone intermediate the conductors $a$ and $c$ which is herein referred to as the zone of inductive interference.

In the extension of the above experiments I substituted a conductor $d$, placed axially within a cylinder $e$, connecting one terminal of the source of electrical supply to said cylinder $e$, and the other to the conductor $d$. Similar phenomenon; namely, a brilliant corona discharge took place. When, however, I substituted a plurality of conductors 1 for the single conductor $d$, said conductors being parallel to each other and concentric to the axis of the cylinder $e$, and coupled them to the initial source of electric energy at the same potential as before, said corona again was destroyed.

This phenomenon was accurately tested by delicate instruments under refined methods, with the result that I definitely proved that by dividing or splitting a conductor into a plurality of parallel members 1, properly spaced and arranged, the leakage or corona losses can practically be overcome, even though the potential transmitted be above the critical voltage of a single solid or stranded conductor having a cross sectional area equal to the combined cross sectional areas of the several members 1 of my so-called divided or split conductor.

My invention, based on the above described principles of action, comprises a transmission line or conductor substantially as illustrated in Fig. 4, which shows a divided conductor consisting of a plurality of longitudinally extending members 1, arranged in annular or polygonal system, and extending parallel to one another and to the axis of the system. These conductor members 1 are maintained in proper relation by spacing disks 2, of any convenient form, insulating or non-insulating, and hold the conductors in spaced relation, so that each is within the zone of inductive interference from adjacent members, these disks being arranged at intervals along the line according to requirements of mechanical support.

The result obtained upon the electric field surrounding a single conductor, and, also, when a conductor is divided or split into a plurality of members 1, as described, is roughly illustrated in Figs. 5 and 6, respectively. With a single conductor $d$, as in Fig. 5, it is seen that the electric field intensity increases continuously up to the surface of the conductor. When the electrical potential upon the conductor $d$ is raised, the field intensity at the surface of the same soon reaches the critical value, when a breakdown of the dielectric surrounding the conductor takes place, giving the phenomenon of corona. A graphic representation of this condition can be shown in the continuous shortening of the concentric uni-potential lines as the surface of the conductor $d$ is reached. In the case of a conductor comprising a plurality of members 1, however, as shown in Fig. 6, the uni-potential lines are not concentric to the individual members 1 of the conductor, but the reason of the inductive interference of the adjacent members or wires, tend to assume a curvature concentric with the annular or polygonal system of members or wires, as a whole, so that the effective convexity of the divided conductor is approximately that of the annular or polygonal system, thus overcoming the high field intensity at the surface of any particular member 1 of said conductor, and preventing the resultant break-down of the dielectric surrounding the conductor, such as would occur with the single conductor $d$ shown in Fig. 5. Thus, it is apparent that constructing a conductor with a plurality of members 1, properly arranged with respect to each other, a much higher potential can be given to that conductor before the breakdown point of the dielectric is reached, than would be possible with a conductor consisting of a single element. It is also evident that the character of the electric field surrounding a divided or split conductor can be varied at will by varying the number and arrangement of the separate members 1 thereof.

I now direct attention to the fact that in practising my invention it may become necessary that my divided or split conductor be especially designed for each particular installation, as atmospheric conditions in the particular locality, the voltage carried, the general construction of the transmission line, together with all other local conditions, will have a decided effect upon the corona phenomenon. It is, therefore, not practicable to establish any standard arrangement of the members 1, of this divided or split conductor, which will be adapted to best meet all conditions, and it is to be understood that any form of divided conductor arranged so as to meet specific conditions is within the scope of my invention.

I here state that a solid or stranded conductor of relatively large effective cross sectional area may have a critical voltage decidedly lower than a conductor embodying this invention, in which the combined cross sectional area of its several members is less than the cross sectional area of the solid or stranded conductor. What I wish to emphasize is that with a plurality of members 1, properly arranged and definitely separated, it is possible to operate my conductor with a higher potential without reaching the critical voltage than would be possible in the employment of a solid or stranded conductor having an effective cross sectional area the equivalent to the sum of the cross sectional areas of all the members 1 of said divided or split conductor.

The conductor above described consists wholly of conductor-elements extending longitudinally and parallel to the axis of the conductor as a whole, so that all the metal of the conductor is fully effective for electric current transmission, and the spacing of such conductor elements around the axis of the conductor as a whole is such as to reduce the intensity of the electrostatic field, and resultant corona, adjacent to the conductor as a whole, to the required extent, solely by the inductive actions due to said longitudinally extending conductor elements, the mechanical supports, extending transversely to the conductor as a whole, and supporting said conductor elements in such spaced relation, being only provided at the intervals required for such mechanical support.

The subdivision of the conductor into spaced apart elements has, in addition to the reduction of corona losses, the advantage of increasing the carrying capacity for comparatively high frequencies, as it decreases the coefficient of self-induction for the conductor as a whole.

The members 1 of my conductor may be arranged in essential parallelism but helically disposed with respect to the common axis, which disposition I desire to be considered as an equivalent to the structure herein disclosed.

Having thus fully described my invention, what I claim as new and desire to secure by Letters Patent is:—

1. A conductor for high tension electrical current transmission consisting wholly of electrically connected conductor elements extending longitudinally and parallel to the axis of the conductor as a whole so that all the metal of the conductor is fully effective for current transmission, and spaced apart around said axis in such relation that the field intensity and resultant corona adjacent each conductor element is reduced by inductive action from adjacent conductor elements, and supporting means for holding said conductor elements in such spaced relation, said supporting means being provided only at such intervals as are required for mechanical support of the conductor.

2. A conductor for high tension electrical current transmission consisting wholly of electrically connected conductor elements extending longitudinally of the axis of the conductor as a whole and arranged in a polygonal system around said axis, so that the effective current carrying capacity of all the metal of the conductor is obtained, and the corona loss from the conductor is reduced to approximately the loss from a conductor having the same cross sectional area as such polygonal system as a whole, and supporting means for holding the conductor elements in such spaced relation, said supporting means being provided only where required for mechanical support of the conductor.

3. A conductor for high tension electrical current transmission consisting wholly of electrically connected conductor elements extending longitudinally of the axis of the conductor as a whole and arranged in a polygonal system around said axis, so that the effective current carrying capacity of all the metal of the conductor is obtained, and the corona loss from the conductor is reduced to approximately the loss from a conductor having the same cross sectional area as such polygonal system as a whole, and supporting means for holding the conductor elements in such spaced relation.

In witness that I claim the foregoing I have hereunto subscribed my name this 10th day of July, 1911.

WALTER AUGUST SCHMIDT.

Witnesses:
   LINN BRADLEY,
   A. A. SCHMIDT.